(12) United States Patent
Sano (10) Patent No.: US 8,090,781 B2
(45) Date of Patent: Jan. 3, 2012

(54) COMMUNICATION TERMINAL, AND DESTINATION-ADDRESS RIGHT/WRONG DETERMINING METHOD AND PROGRAM THEREOF

(75) Inventor: Motonori Sano, Tokyo (JP)

(73) Assignee: Sony Ericsson Mobile Communications AB, Lund (SE)

( * ) Notice: Subject to any disclaimer, the term of this patent is extended or adjusted under 35 U.S.C. 154(b) by 692 days.

(21) Appl. No.: 11/868,165

(22) Filed: Oct. 5, 2007

(65) Prior Publication Data

US 2008/0114846 A1     May 15, 2008

(30) Foreign Application Priority Data

Nov. 14, 2006   (JP) ................................. 2006-307542

(51) Int. Cl.
    *G06F 15/16*     (2006.01)
    *H04M 11/00*     (2006.01)

(52) U.S. Cl. ..................................... 709/206; 379/93.01

(58) Field of Classification Search ................... 709/206
See application file for complete search history.

(56) References Cited

U.S. PATENT DOCUMENTS

| | | | | | |
|---|---|---|---|---|---|
| 6,073,133 | A | * | 6/2000 | Chrabaszcz ............................ | 1/1 |
| 7,149,780 | B2 | * | 12/2006 | Quine et al. .................. | 709/206 |
| 7,610,344 | B2 | * | 10/2009 | Mehr et al. ..................... | 709/206 |
| 7,945,954 | B2 | * | 5/2011 | Coueignoux .................... | 726/22 |
| 2002/0065891 | A1 | * | 5/2002 | Malik ........................... | 709/206 |
| 2002/0138579 | A1 | * | 9/2002 | Goldberg ...................... | 709/206 |
| 2002/0174170 | A1 | * | 11/2002 | Ioffe et al. ..................... | 709/201 |
| 2003/0091167 | A1 | * | 5/2003 | Hirai ........................... | 379/93.01 |
| 2004/0093428 | A1 | | 5/2004 | Arnold et al. | |
| 2004/0203949 | A1 | * | 10/2004 | Nielsen et al. ................ | 455/466 |
| 2004/0215726 | A1 | | 10/2004 | Arning et al. | |
| 2006/0010215 | A1 | * | 1/2006 | Clegg et al. .................... | 709/206 |
| 2006/0031359 | A1 | * | 2/2006 | Clegg et al. .................... | 709/206 |
| 2006/0168024 | A1 | * | 7/2006 | Mehr et al. .................... | 709/206 |

FOREIGN PATENT DOCUMENTS

| | | |
|---|---|---|
| JP | 11-31109 | 2/1999 |
| JP | 11-243412 | 9/1999 |
| JP | 2003-157216 | 5/2003 |
| JP | 2005-250594 | 9/2005 |

* cited by examiner

*Primary Examiner* — Jeffrey Pwu
*Assistant Examiner* — Guang Li
(74) *Attorney, Agent, or Firm* — Oblon, Spivak, McClelland, Maier & Neustadt, L.L.P.

(57) ABSTRACT

A communication terminal having an email message sending-and-receiving function includes an email-message history information storing unit configured to store email-message information of at least a sent email message as email-message history information, an intended-to-be-sent email message storing unit configured to store email-message information of an intended-to-be-sent email message, the intended-to-be-sent email message being an email message which is going to be sent, as intended-to-be-sent email message information, a destination-address right/wrong determining unit configured to determine whether a destination address of the intended-to-be-sent email message is right or wrong by comparing the email-message history information with the intended-to-be-sent email message information, and a unit configured to send, if the destination address is determined to be wrong, a notification of the wrong destination address to a user and to request the user to check the destination address.

8 Claims, 9 Drawing Sheets

COMMUNICATION TERMINAL, AND DESTINATION-ADDRESS RIGHT/WRONG DETERMINING METHOD AND PROGRAM THEREOF

CROSS REFERENCES TO RELATED APPLICATIONS

The present invention contains subject matter related to Japanese Patent Application JP 2006-307542 filed in the Japanese Patent Office on Nov. 14, 2006, the entire contents of which are incorporated herein by reference.

BACKGROUND OF THE INVENTION

1. Field of the Invention

The present invention relates to a communication terminal having an email-message sending-and-receiving function, and more particularly to a method and a program which perform destination-address right/wrong determination of an email message.

2. Description of the Related Art

Now, email via a communication network such as the Internet has widely become popular as a communication tool even for communication terminals such as mobile phones as well as personal computers (PC). Nowadays, email has become indispensable for most people. (Hereinafter, email messages are also simply referred to as messages.)

In recent years, such communication terminals receive a large number of so-called unsolicited email messages (spams) sent for advertising, fraud, or the like regardless of a user's intentions. As a result, email messages that the user wishes to read are buried among the unsolicited email messages.

In order to cope with such unsolicited email messages, most email software programs have a received-message filtering function. As an example of such a received-message filtering function, there is a received-message filter to which a Bayesian approach is applied and which automatically determines whether an email message is an unsolicited email message or not on the basis of a subject or a message body of the email message. With regard to such a received-message filter, it is necessary for a user who uses the email software program to manually determine whether or not each email message received is an unsolicited email message for a certain period of time at the beginning. After sufficient information used for the automatic determination is stored as the result of the user's manual determination, the received-message filter automatically determines whether or not each email message received is an unsolicited email message at the time of receiving the email message. The determination is performed on the basis of whether or not a subject or a message body of an email message just received includes certain words that are included a large number of times in subjects or message bodies of the unsolicited email messages received in the past. If the email message just received includes the certain words, the email message just received is determined as an unsolicited email message.

One advantage of email is that a message is delivered instantly after performing a sending operation. However, if a message has a wrong destination address, that is also delivered instantly after performing the sending operation. Recent email software programs (mailers) are designed to select a destination address easily from an address book or the like. Thus, the probability of selecting a wrong destination address has been increased. In a real-world situation, personal information or confidential information is often sent by email, and thereby such information may be leaked by selecting a wrong destination address.

It has been necessary for a user to check that a message has a right destination address by himself/herself in order to prevent the message from being sent to a wrong destination address.

In order to deal with such a problem at the time of sending a message, the following technique has been proposed. Destination addresses that have a high probability of being mistakenly selected are marked in advance and if a user tries to send a message to one of the marked destination addresses, the user is requested to check whether it is permitted to send the message thereto (see Japanese Unexamined Patent Application Publication No. 11-243412).

Another technique for an email sending operation has also been proposed. When an email message is requested to be sent, by delaying start of the sending operation, a user is given a certain amount of time to cancel the sending operation in the case that the user notices the message is going to be sent to a wrong destination address (see Japanese Unexamined Patent Application Publication No. 2003-157216).

SUMMARY OF THE INVENTION

In the technique described in Japanese Unexamined Patent Application Publication No. 11-243412, it is necessary to mark destination addresses which the user should be careful with in advance. Therefore, there is no advantage to this technique as regards unmarked destination addresses. Although the user should be careful not to send a message to a wrong destination address regardless of who the recipient is, the destination addresses all marked in advance lead to the sending operation not only being troublesome but also ineffective.

In the technique described in Japanese Unexamined Patent Application Publication No. 2003-157216, if the user has not noticed that the message is going to be sent to the wrong destination address during the time given by delaying start of the sending operation, the message is sent to the wrong destination address. The user may not notice that the message has a wrong destination address on every occasion just after requesting the sending operation, and may often realize that the message has been sent to the wrong destination address after receiving a notification message from the wrong destination address.

In a communication terminal having an email message sending-and-receiving function, it is desirable to determine the possibility of a message being sent to a wrong destination address on the basis of message history information of past messages at the time of sending the message, and to prevent the message from being sent to the wrong destination address beforehand.

A communication terminal according to an embodiment of the present invention has an email message sending-and-receiving function. The communication terminal includes email-message history information storing means for storing email-message information of at least a sent email message as email-message history information, intended-to-be-sent email message storing means for storing email-message information of an intended-to-be-sent email message, the intended-to-be-sent email message being an email message which is going to be sent, as intended-to-be-sent email message information, destination-address right/wrong determining means for determining whether a destination address of the intended-to-be-sent email message is right or wrong by comparing the email-message history information with the intended-to-be-sent email message information, and means for sending, if the destination address is determined to be wrong, a notification of the wrong destination address to a user and requesting the user to check the destination address.

As more message history information is stored, information that is more unique to each target address can be extracted. By comparing this information with the information of the intended-to-be-sent message, the target address corresponding to the intended-to-be-sent message can be assumed. If the assumed target address matches the destination address of the intended-to-be-sent message, the destination address may be determined to be right. Otherwise, the destination address may be determined to be wrong.

More specifically, the communication terminal may further include keyword extracting means for extracting keywords per target address from the email-message history information and extracting keywords from the intended-to-be-sent email message, and the destination-address right/wrong determining means may determine whether the destination address of the intended-to-be-sent email message is right or wrong by comparing the keywords extracted from the intended-to-be-sent email message information with those extracted from the email-message history information.

Destination-address right/wrong determining method and program according to an embodiment of the present invention are used in a communication terminal having an email message sending-and-receiving function. The method and program include the steps of storing email-message information of at least a sent email message as email-message history information, storing email-message information of an intended-to-be-sent email message, the intended-to-be-sent email message being an email message which is going to be sent, as intended-to-be-sent email message information, determining whether a destination address of the intended-to-be-sent email message is right or wrong by comparing the email-message history information with the intended-to-be-sent email message information, and sending, if the destination address is determined to be wrong, a notification of the wrong destination address to a user and requesting the user to check the destination address.

The following advantages are expected according to embodiments of the present invention:

When a user sends a message, the probability of sending the message to a wrong destination address can be reduced even if a destination address is wrong since the user is notified of the probability that the message may have a wrong destination address.

It is not necessary for a user to perform any special operation such as marking one or more email addresses beforehand in order to check whether the destination address is right or wrong.

The more messages are sent or received, the more message history information is stored, the message history information being used for comparison with an intended-to-be-sent message; therefore, the accuracy of destination-address right/wrong determination increases.

DESCRIPTION OF THE PREFERRED EMBODIMENTS

Preferred embodiments of the present invention will be specifically described below with reference to the attached figures.

Figure 1:
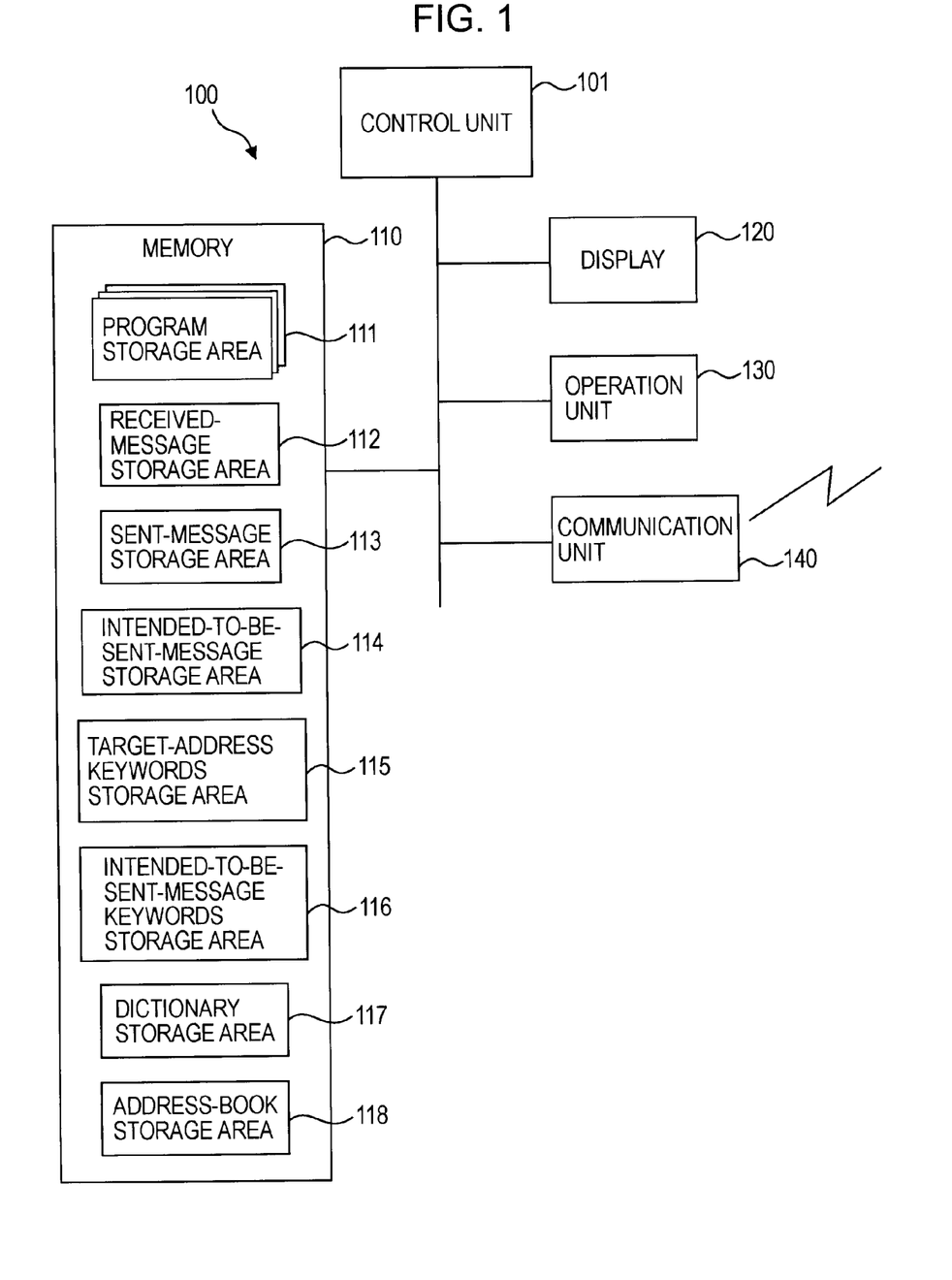
FIG. 1 is a block diagram showing a schematic structure of a communication terminal according to an embodiment of the present invention.

FIG. 1 is a schematic diagram showing a structure of a communication terminal 100 in which an email software program (a mailer) having a destination-address right/wrong determining function according to an embodiment of the present invention is installed. The communication terminal 100 may be any apparatus having an email function, for example, a personal computer (PC), a mobile phone, or a personal digital assistant (PDA).

The communication terminal 100 includes a control unit 101, a memory 110, a display 120, an operation unit 130, and a communication unit 140. The control unit 101 includes a processor such as a central processing unit (CPU) and controls the entire apparatus as programmed. The display 120 visualizes information by using a display device such as a liquid crystal display (LCD), an organic electroluminescent (EL) display, a plasma display, or a cathode ray tube (CRT). The operation unit 130 includes a user interface such as a keyboard, a numeric keypad, or a mouse. The communication unit 140 performs communication by accessing a communication network including a local area network (LAN), a mobile-phone network, or the Internet via a wired or wireless network.

The memory 110 may be a read-only memory (ROM), a random access memory (RAM), a flash memory (a rewritable nonvolatile memory), or an external storage device (for example, a hard disk drive (HDD)). According to the embodiment of the present invention, the memory 110 includes a program storage area 111, a received-message storage area 112, a sent-message storage area 113, an intended-to-be-sent-message storage area 114, a target-address keywords storage area 115, an intended-to-be-sent-message keywords storage area 116, a dictionary storage area 117, and an address-book storage area 118. Various programs stored in the program storage area 111 include an email software program and a software module for realizing a destination-address right/wrong determining function according to an embodiment of the present invention. A dictionary in the dictionary storage area 117 is utilized when keywords, which will be described below, are extracted in the destination-address right/wrong determining function. Therefore, the dictionary in the dictionary storage area 117 stores at least various nouns, common last names, first names, company names, place names, and the like. The dictionary may learn words and the like which a user has input when creating a message, and the learned words and the like may be added to the dictionary. In addition, this dictionary may double as an existing kana-kanji transformation dictionary.

Figure 2:
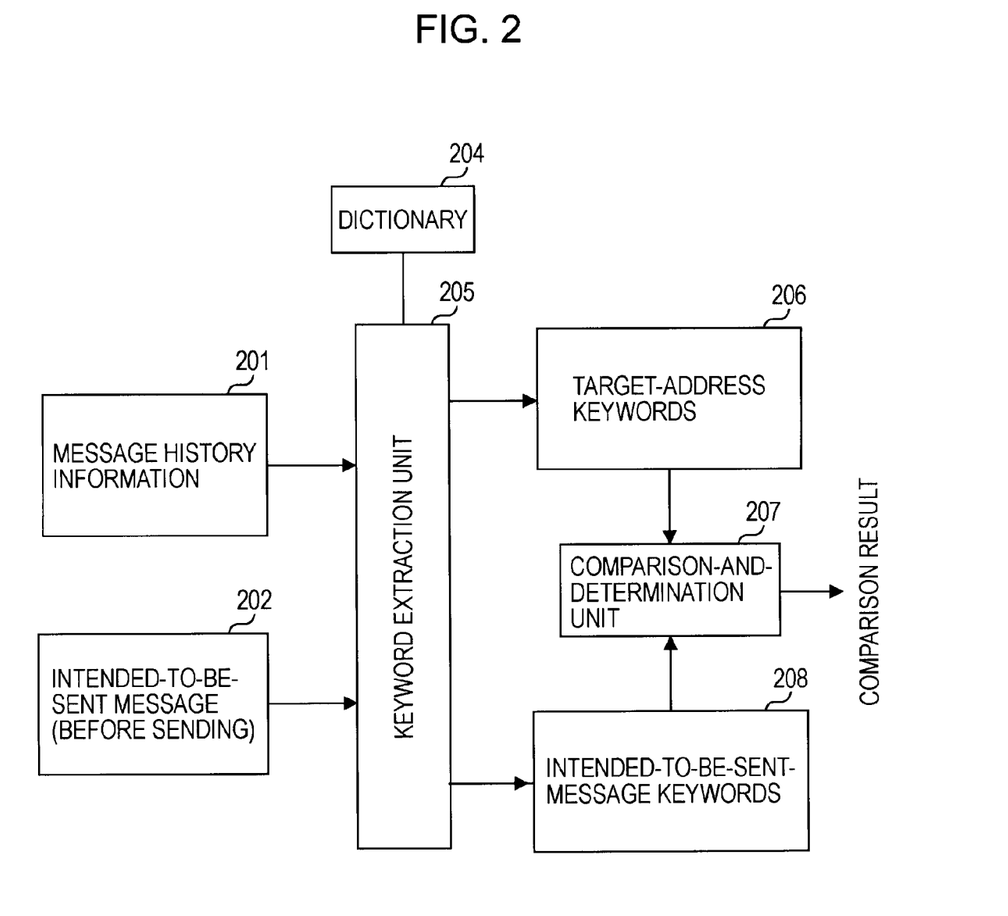
FIG. 2 is a functional block diagram showing major functions for realizing a destination-address right/wrong determining function according to the embodiment of the present invention.

FIG. 2 is a functional block diagram showing major functions for realizing the destination-address right/wrong determining function according to the embodiment of the present invention.

Major function units include a keyword extraction unit 205 and a comparison-and-determination unit 207. These units are realized by software processing of the control unit 101 shown in FIG. 1, and are components for a transmission filter.

The keyword extraction unit 205 generates target-address keywords 206 from message history information 201 by referring to a dictionary 204 stored in the dictionary storage area 117 (FIG. 1). The message history information 201 utilized in the embodiment of the present invention mainly includes information of previously sent messages. The message history information 201 may also include information of previously received messages. In addition, the information of the previously sent messages may be limited to that of the messages previously sent to a target address registered in an address book (and the information of previously received messages may be limited to that of the messages previously received from the target address registered in the address book). This limitation is advantageous for received messages especially in the case of receiving unsolicited messages or the like.

The target-address keywords 206 include a group of keywords extracted from the message history information 201 of each of target addresses. The target-address keywords 206 are stored in the target-address keywords storage area 115 shown in FIG. 1. A keyword is extracted from a message body and a subject of a message in an embodiment of the present invention; however, such a keyword may be extracted only from a message body of a message.

The keyword extraction unit 205 similarly extracts keywords from an intended-to-be-sent message 202 which a user is going to send and which is stored in the intended-to-be-sent-message storage area 114 shown in FIG. 1 in order to generate intended-to-be-sent-message keywords 208. The intended-to-be-sent-message keywords 208 are stored in the intended-to-be-sent-message keywords storage area 116 shown in FIG. 1.

The comparison-and-determination unit 207 compares the intended-to-be-sent-message keywords 208 with the target-address keywords 206, and determines whether a destination address of the intended-to-be-sent message is right or wrong. Note that this determination result is just an estimation; therefore, if the destination address is determined to be wrong, the user is simply notified of the wrong destination address as described below.

Figure 3A:
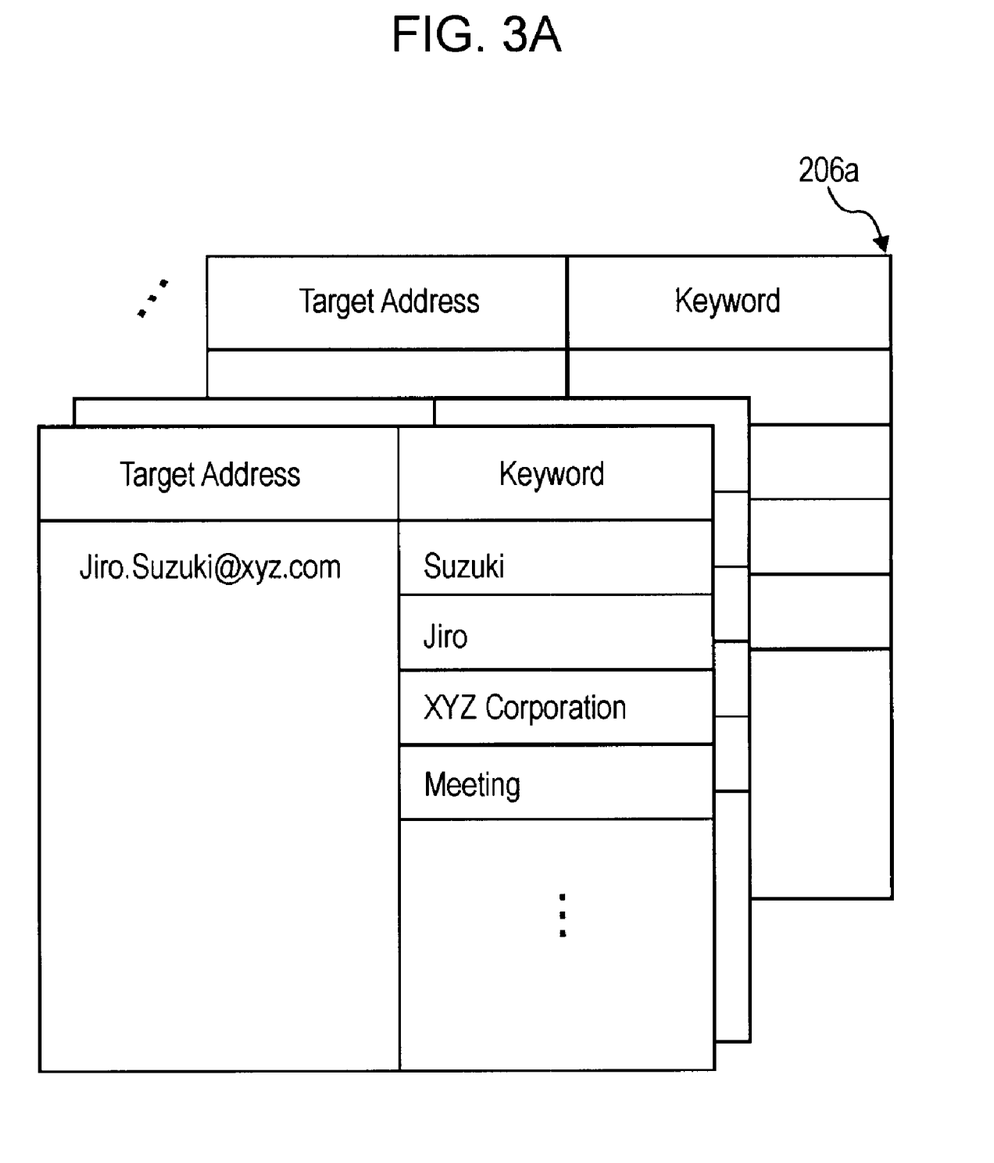
FIGS. 3A and 3B are diagrams each showing an example of target-address keywords.
Figure 3B:
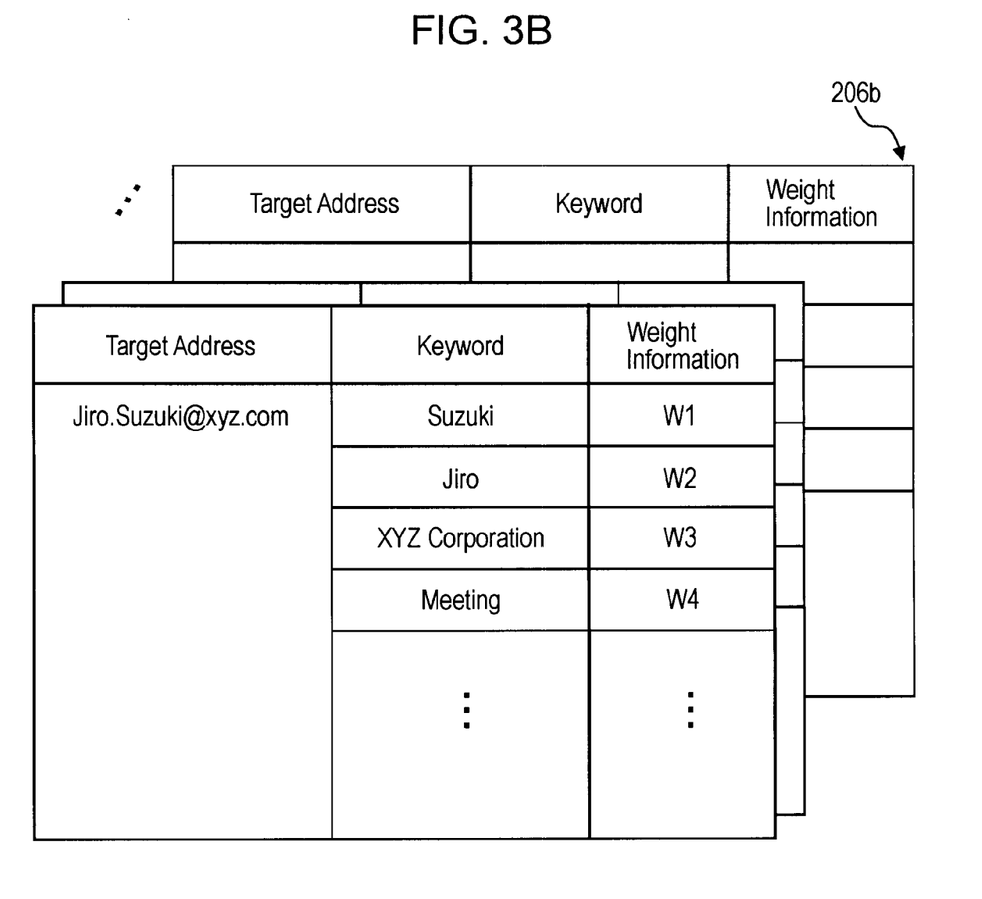

FIGS. 3A and 3B show target-address keywords 206a and target-address keywords 206b, respectively, each serving as the target-address keywords 206 independently. The target-address keywords 206a include keywords, which are extracted from messages previously sent to the target addresses (or messages previously received from the target addresses) and listed on an address-by-address basis in the target-address keywords 206a. The target-address keywords 206b include the keywords shown in the target-address keywords 206a and weight information. The weight information such as w1, w2, or w3 is related to each of the keywords. The weight information means the frequency of appearance of a keyword in messages previously sent to a target address (or messages previously received from the target address) to which the keyword belongs. For example, if a certain keyword appears in sixty of the two hundred messages, weight information of the keyword becomes a decimal "0.3".

A typical example of a concept of the destination-address right/wrong determination according to the embodiment of the present invention is described as follows. When a user creates a message and tries to send it, a transmission filter compares information of the message with message history information of previously sent messages, and thus a destination address of the message is determined to be right or wrong. For example, descriptions of messages previously sent to and received from an address A relate to a specific topic on every occasion. In such a case, a certain word or words tend to be included a large number of times in the subjects or the message bodies of the previously sent and received messages. Therefore, every time the user sends a message to the address A, a subject or a message body of the message is compared with the subjects or the message bodies of the messages previously sent to the address A. As a result of this comparison, if the message going to be sent includes the certain word or many of the certain words included a large number of times in the subjects or the message bodies of the previously sent or received messages, the address A is determined to be right.

However, if the user tries to send a message related to a totally different topic to the address A, the transmission filter determines that the address A is wrong. This is because the subjects or the message bodies of the messages previously sent to the address A rarely include words used in a subject or a message body of the message related to the totally different topic. Here, the transmission filter requests the user to check whether the destination address is right (correct) or not. This request for the user's check is performed by indicating the destination address demonstratively such as by displaying a dialog box. If the destination address is determined to be right by the user, an ordinary sending operation is performed. If the target address is determined to be wrong by the user, the user corrects it.

If the message is going to be sent to a plurality of destination addresses, each of the destination addresses is checked to determine whether it is right or wrong. After all of the destination addresses are checked, the user is notified of the wrong destination address(es).

In particular, when a message is going to be sent to a plurality of destination addresses, additional information registered in an address book or the like may also be utilized to check to determine whether the destination addresses are right or wrong. For example, additional information "group" can be registered as one of the properties of each address in an address book installed in a mobile phone. A user of the mobile phone is expected to have registered the same group information to certain addresses having something in common. Therefore, if all destination addresses to which a message is going to be sent belong to the same group, the destination addresses are determined to be right. In this case, the message is sent to the destination addresses without requesting the user's check. If all destination addresses to which a message is going to be sent do not belong to the same group, an address belonging to a minor group is determined to possibly be wrong. Then, the user is requested to check whether the destination address is right or not. For example, when a message is sent to ten addresses at a time, destination addresses A, B, C, D, E, and F belong to group α, destination addresses G, H, and I belong to group β, and a destination address J belongs to group γ. In such a case where each of the destination addresses belongs to one of the three groups, it is determined that the message is going to be sent to addresses belonging to group α, to which the above-described six addresses belong, in this example. It is determined that the other four destination addresses, each belonging to either group β or γ, may be wrong, thereby the user is requested to check the four destination addresses.

The accuracy of the destination-address right/wrong determination function is assumed to be insufficient until a certain amount of message history information has been stored; therefore, this determination function may be suspended until information of a predetermined number of messages has been stored.

The following is a specific description for an operation and processing of the destination-address right/wrong determination according to the embodiment of the present invention.

Figure 4:
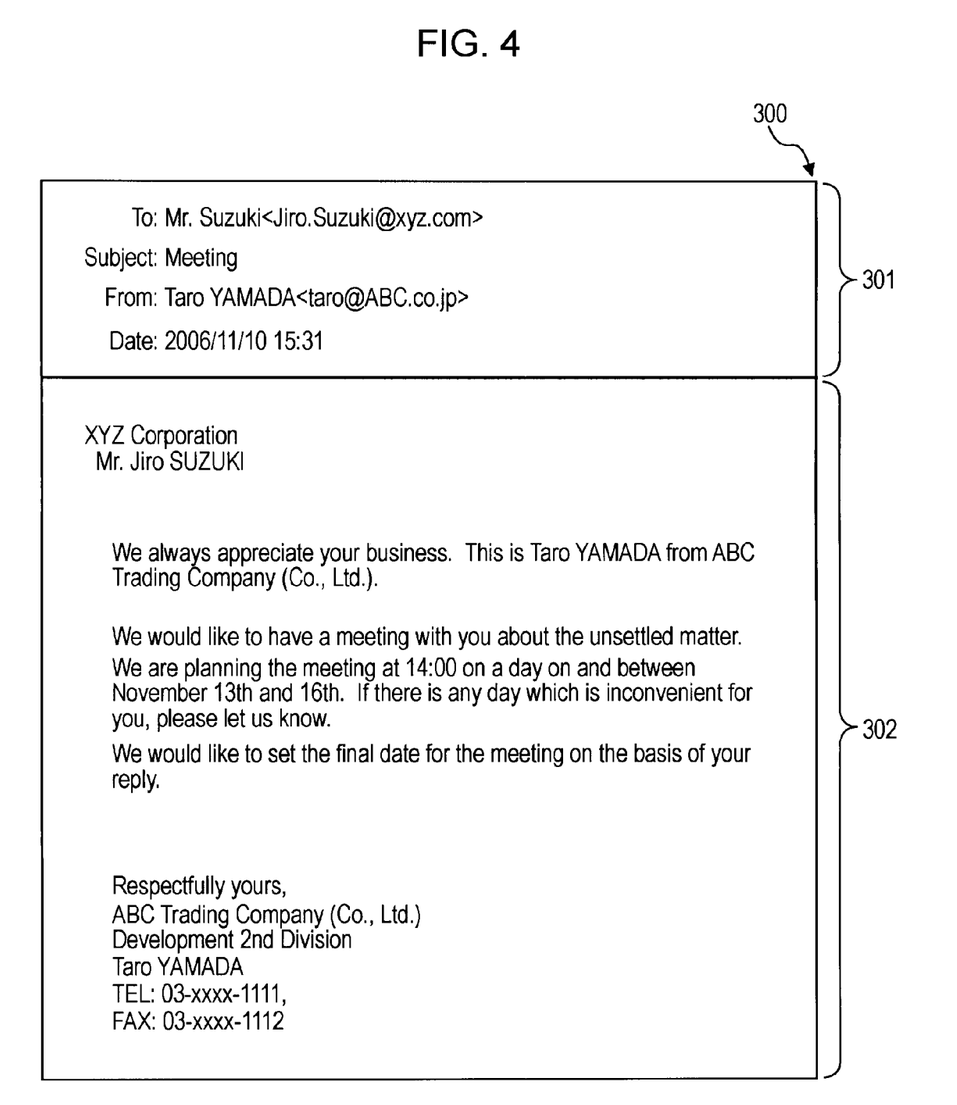
FIG. 4 is a diagram showing a general structure of an intended-to-be-sent message.

FIG. 4 shows a general structure of an intended-to-be-sent message 300. The intended-to-be-sent message 300 includes a header 301 and a message body 302. The header 301 usually includes a "destination", a "subject", a "sender", and a "date". The destination and the sender include email addresses. Arbitrary display names may be added to the destination and the sender in addition to the email addresses. The sender or the date may not be displayed in the header 301 as in sent messages displayed on mobile phones. Although contents of the message body 302 may be created according to a user's own will, an organization name to which a recipient belongs or the recipient's name generally tends to be described in the first several lines.

Figure 5:
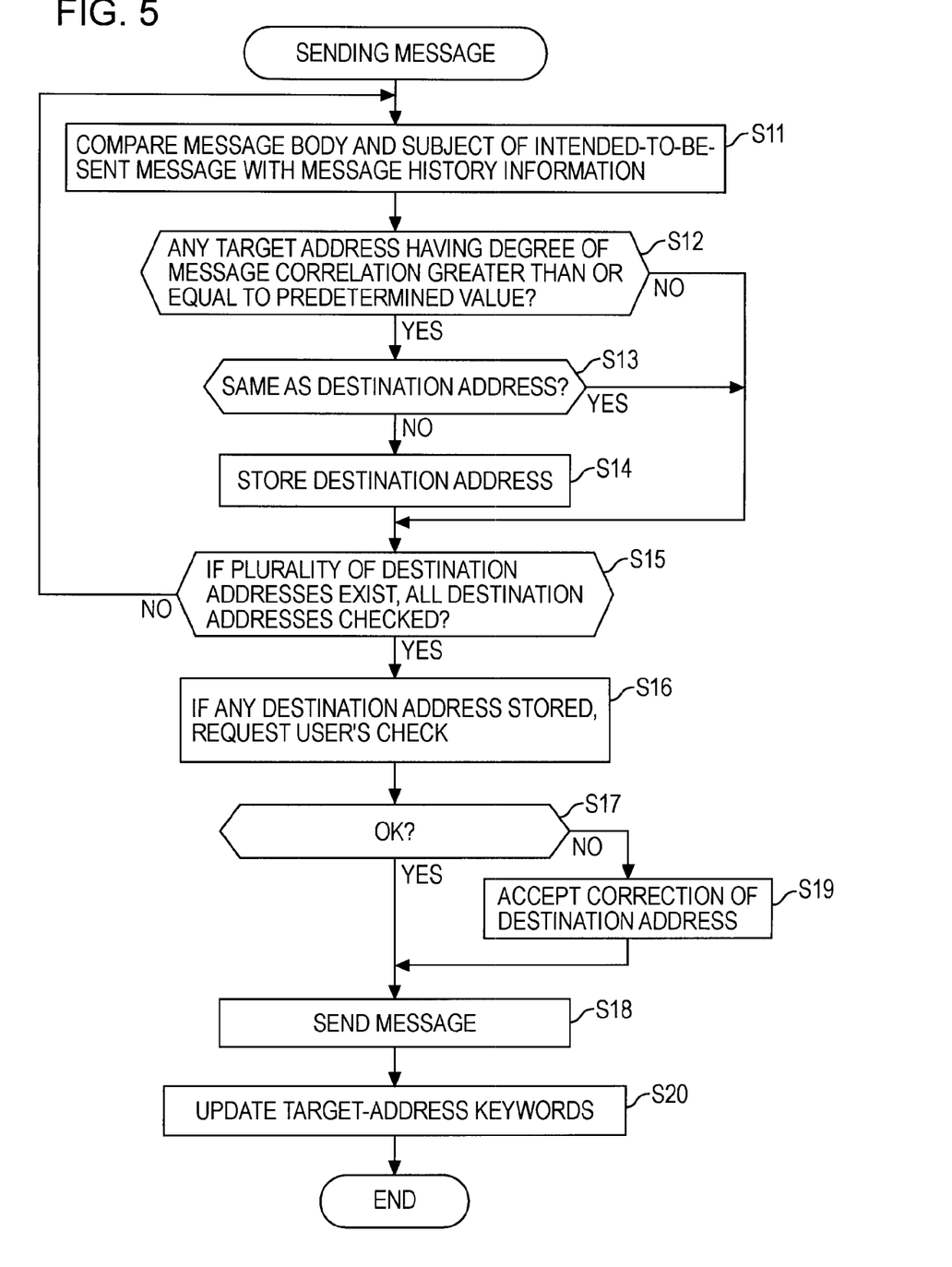
FIG. 5 is a flowchart of first message sending processing according to the embodiment of the present invention.

FIG. 5 shows a flowchart of first message sending processing according to the embodiment of the present invention. This processing is performed by the control unit 101 (FIG. 1) when a user issues a send command for a message which the user has created.

First, a message body and a subject of an intended-to-be-sent message are compared with message history information of previously sent messages (step S11). As described above, this is performed by extracting keywords from the intended-to-be-sent message and comparing the extracted keywords with keywords of the previously sent messages. Here, the extracted keywords are compared with the keywords corresponding to all the target addresses in the target-address keywords 206 (FIG. 3) in order to obtain a degree of message correlation between the intended-to-be-sent message and the past messages (the previously sent messages, at least) of each of the target addresses. Here, the "degree of message correlation" indicates a correlation between contents of the intended-to-be-sent message and those of the message previously sent to a target address (or the message previously received from the target address). If this degree of message correlation is high, the intended-to-be-sent message is assumed to be sent to the target address with a high probability. The way to obtain the degree of message correlation will be specifically described below.

The target addresses are checked to determine whether there is any target address having a degree of message correlation greater than or equal to a predetermined value (step S12). If there are a plurality of target addresses having a degree of message correlation greater than or equal to the predetermined value, the target address having the highest degree of message correlation is selected. If the selected target address and the destination address of the intended-to-be-sent message are the same (Yes in step S13), the process proceeds to step S15. If the selected target address and the destination address of the intended-to-be-sent message are not the same (No in step S13), the destination address of the intended-to-be-sent message is stored (step S14). The selected target address may also be stored in step S14. If there are a plurality of target addresses having a message correlation greater than or equal to the predetermined value, all the target addresses having the message correlation greater than or equal to the predetermined value may be selected, and the target address/addresses that are not the same as the destination address of the intended-to-be-sent message may all be stored.

If there are a plurality of destination addresses of the intended-to-be-sent message, step S13 is performed on all of the destination addresses (step S15).

Figure 7A:
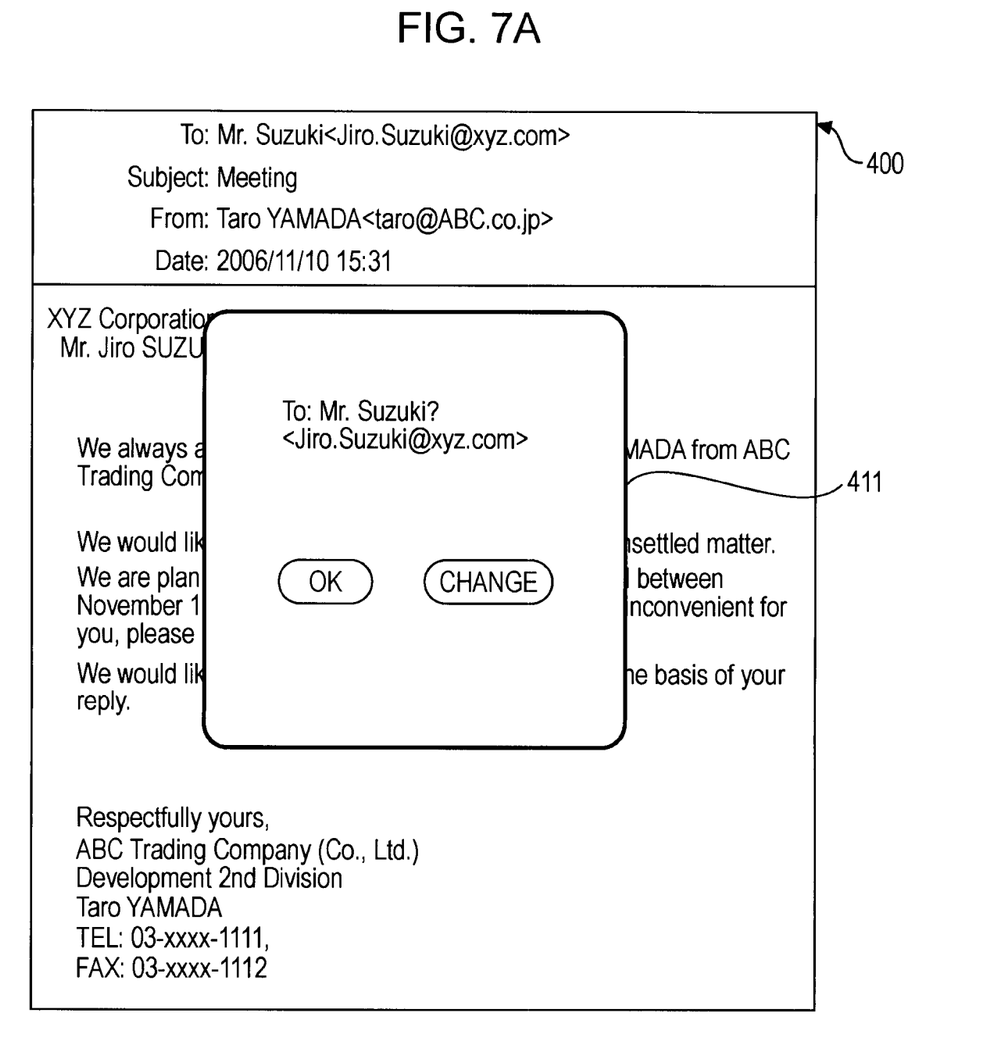
FIGS. 7A and 7B are diagrams each showing a dialog box on a display screen according to the embodiment of the present invention.
Figure 7B:
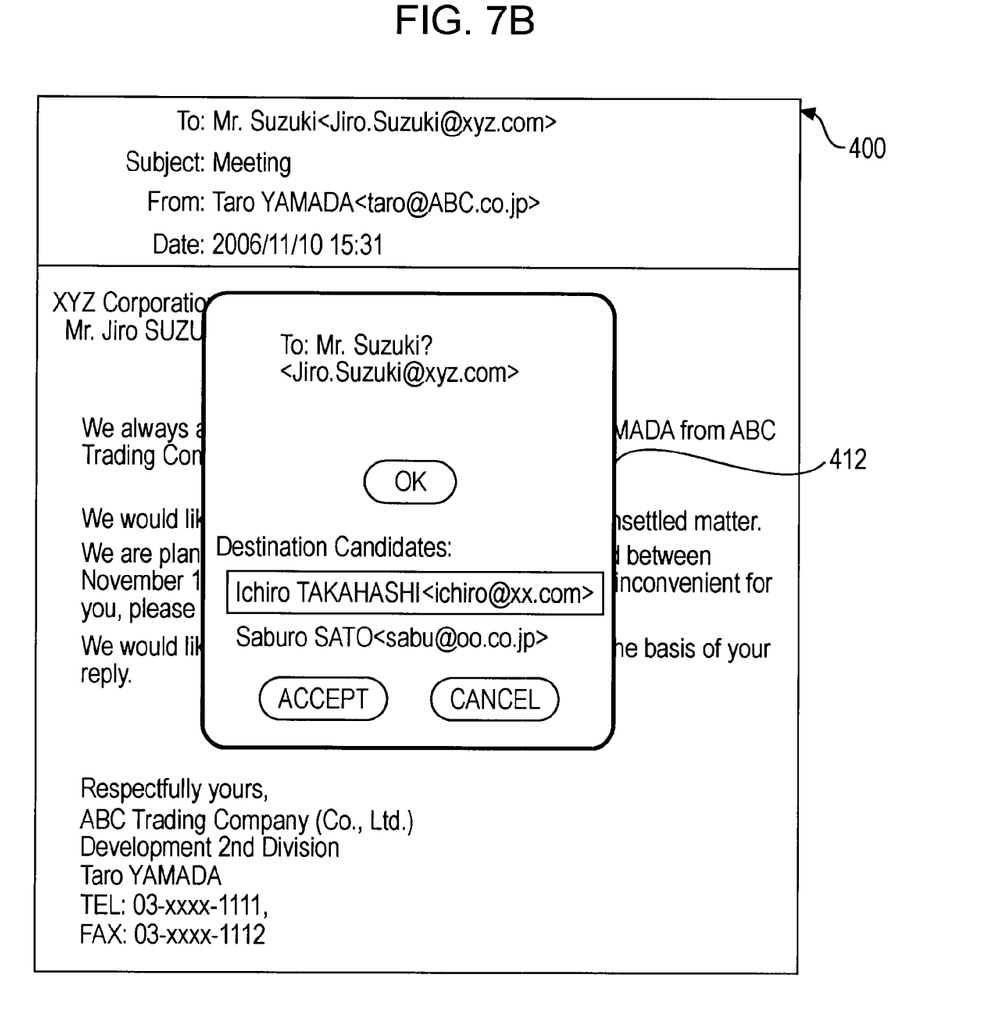

Then, if one or more destination addresses stored exist, the user is notified that the destination address/addresses may be wrong, and requested to check whether the destination address/addresses are right or wrong (step S16). For example, this may be performed by displaying a dialog box 411 on a display screen 400 as shown in FIG. 7A. FIG. 7A is an example of displaying of a stored destination address (and a corresponding name thereof, if it exists). FIG. 7B shows a dialog box 412 similar to the dialog box 411. Other target addresses with a high degree of message correlation (here, the case where a plurality of such target addresses exist is shown) are displayed as "Destination Candidates" in addition to the stored destination address in the dialog box 412.

If the user's check result is "OK" (Yes in step S17), the intended-to-be-sent message is sent (step S18). Then, the target-address keywords 206 (FIG. 3) are updated by using the keywords of the intended-to-be-sent message (step S20). If the user's check result is not "OK" (No in step S17), the user is allowed to correct the destination address (step S19). Alternatively, in the case of FIG. 7B, the destination address can be replaced by selecting a desired destination address, if it exists in Destination Candidates, and selecting "ACCEPT" (step S19). In this case, after the message is sent (step S18), keywords corresponding to the target address that is the same as the corrected destination address in the target-address keywords 206 (FIG. 3) are updated on the basis of the keywords of the intended-to-be-sent message (step S20).

After the destination address has been corrected, the message is sent; however, the corrected destination address may be checked again to determine whether it is right or not.

Figure 6:
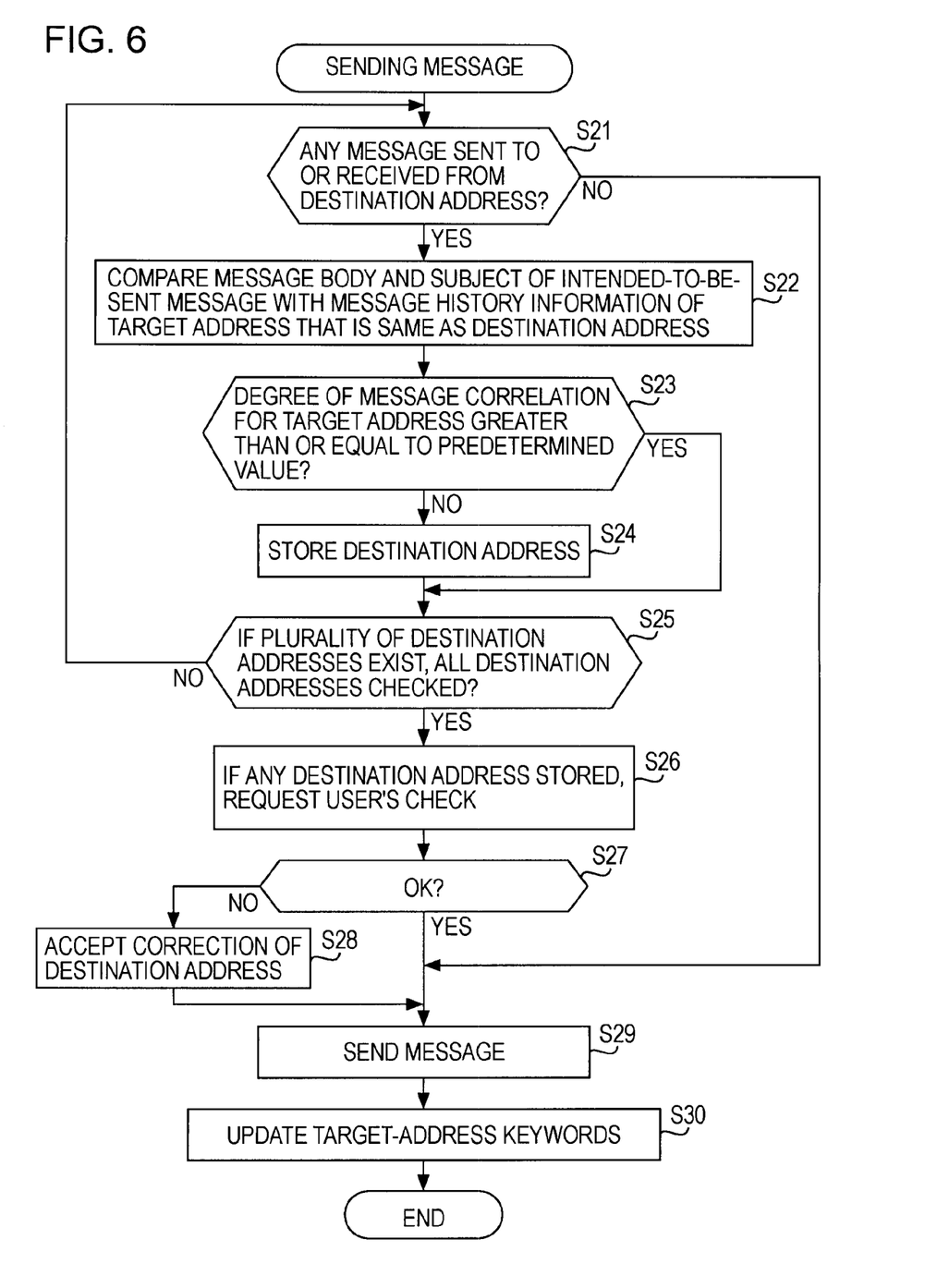
FIG. 6 is a flowchart of second message sending processing according to the embodiment of the present invention.

FIG. 6 shows a flowchart of second message sending processing.

In the message sending processing shown in FIG. 5, first, the target-address keywords 206 are all checked regardless of the destination address/addresses of the intended-to-be-sent message. In contrast with this, message sending processing shown in FIG. 6 is as follows. First, a destination address/addresses are checked to determine whether messages have previously been sent to or received from the destination address/addresses. The message sending processing shown in FIG. 6 is designed to check just the target address/addresses that are the same as the destination address/addresses which at least one message has previously been sent to or received from.

First, it is checked whether or not a message has previously been sent to or received from a target address that is the same as a destination address (step S21). If no message has previously been sent to or received from the target address that is the same as the destination address, an intended-to-be-sent message is sent (step S29). Then, keywords corresponding to the target address that is the same as the destination address in the target-address keywords 206 (FIG. 3) are updated on the basis of keywords of the intended-to-be-sent message (step S30).

If a message has previously been sent to or received from the target address that is the same as the destination address, the keywords of the intended-to-be-sent message are compared with message history information (namely, keywords) of message bodies and subjects of the past messages, which have been sent to (or received from) the target address that is the same as the destination address (step S22). As a result, if a degree of message correlation for the target address that is the same as the destination address is greater than or equal to a predetermined value (Yes in step S23), the process proceeds to step S25. If the degree of message correlation is less than the predetermined value, the destination address is stored (step S24).

In step S25, if there are a plurality of the destination addresses, the above-described processing is repeatedly performed until all the destination addresses are processed. After the entire destination addresses have been processed, if one or more destination addresses stored in step S24 exist, similarly to the case shown in FIG. 5, the user is notified that the destination address/addresses may be wrong, and requested to check whether the destination address/addresses are right or wrong (step S26).

If the user's check result is "OK" (Yes in step S27), the intended-to-be-sent message is sent (step S29). Then, the target-address keywords 206 (FIG. 3) are updated by using the keywords of the intended-to-be-sent message (step S30). If the user's check result is not "OK" (No in step S27), the user is allowed to correct the destination address (step S28). Alternatively, in the case of FIG. 7B, the destination address can be replaced by selecting a desired destination address, if it exists in Destination Candidates, and selecting "ACCEPT" (step S28). In this case, after the message is sent (step S29), the keywords corresponding to the target address that is the same as the corrected destination address in the target-address keywords 206 (FIG. 3) are updated on the basis of the keywords of the intended-to-be-sent message (step S30).

Any of the following methods can be employed as a specific method for obtaining a degree of message correlation used for the destination-address right/wrong determination.

(1) Keywords extracted from an intended-to-be-sent message are compared with keywords corresponding to a specified target address. The proportion of keywords of the intended-to-be-sent message which match keywords of the specified target address is a degree of message correlation. For example, a degree of message correlation R can be obtained by the following expression:

$R$=(the number of keywords matched)/(the number of keywords extracted from the intended-to-be-sent message).

For example, if twenty keywords are extracted from an intended-to-be-sent message and ten of the twenty keywords match keywords corresponding to a target address, a degree of message correlation between a destination address of the intended-to-be-sent message and the target address is 0.5. This method is suitable for the case where the above-mentioned "weight information" is not used.

(2) Keywords extracted from an intended-to-be-sent message are compared with keywords corresponding to a specified target address. If a keyword extracted from the intended-to-be-sent message matches any of the keywords corresponding to the specified target address, the match is weighted on the basis of weight information of the matched keyword to obtain a degree of message correlation. For example, as in the above-described example, if twenty keywords are extracted from an intended-to-be-sent message and ten of the twenty keywords match keywords corresponding to a target address, a degree of message correlation R can be obtained by the following expression in which weight information of each matched keyword is added, and the sum is divided by the number of the keywords extracted from the intended-to-be-sent message:

$R$=(the sum of weight information of matched keywords)/(the number of the keywords extracted from the intended-to-be-sent message).

(3) If a keyword implying a person's name is included in the first several lines of a message body of an intended-to-be-sent message, and if the same keyword exists in keywords corresponding to a specified target address, a degree of message correlation for the target address increases by a predetermined amount or ratio. Alternatively, if a keyword implying a person's name is included in the first several lines of a message body of an intended-to-be-sent message, and if the same keyword with weight information that is greater than or equal to a predetermined value exists among keywords corresponding to a specified target address, the degree of message correlation for the specified target address becomes a predetermined maximum value.

The keywords corresponding to all the target addresses in the target-address keywords 206 are objects of the comparison; however, if weight information exists, the target addresses with weight information which is greater than or equal to a predetermined value may just be selected for the objects of the comparison.

The embodiments of the present invention have been described above. Various modifications and alterations can be made other than what has been described above. That is, the above-described information or memory areas, processing steps of the flowcharts, the expressions, and the like are merely specific examples in order to solve the problems. Therefore, the present invention should not be limited to the above examples.

For example, although two examples of message sending processing are shown in the present invention, one of the examples or a combination of both of the examples may be employed.

Previously sent and received messages are described for the message history information, the message history information being utilized for the destination-address right/wrong determination; however, the sent messages may just be utilized as the message history information if desired.

If a keyword implying a person's name is included in the first several lines of a message body of an intended-to-be-sent message, the destination-address right/wrong determination may be performed, without obtaining a degree of message correlation, on the basis of whether or not the same keyword exists in keywords corresponding to a specified target address.

An example of a display screen is one employing a PC; however, a mobile terminal can be similarly employed but would have a limitation such as display size or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal having an email message sending-and-receiving function, the communication terminal comprising:

means for storing email-message information of at least a sent email message as email-message history information;

storing means for storing email-message information of an intended-to-be-sent email message that is being prepared at said communication terminal, the intended-to-be-sent email message being an email message which has yet to be sent from the communication terminal, as intended-to-be-sent email message information;

means for determining at the communication terminal whether a destination address of the intended-to-be-sent email message is right or wrong by comparing the email-message history information with at least a message body of the intended-to-be-sent email message information;

means for displaying a notification of the wrong destination address to a user if the destination address is determined to be wrong and requesting the user to check the destination address prior to sending the email message from the communication terminal; and means for extracting keywords per target address from the email-message history information and extracting keywords from the message body of the intended-to-be-sent email message, wherein the means for determining determines whether the destination address of the intended-to-be-sent email message is right or wrong by comparing the keywords extracted from the intended-to-be-sent email message information with those extracted from the email-message history information.

2. The communication terminal according to claim 1, wherein the means for extracting keywords adds weight information to each of the keywords per target address extracted from the intended-to-be-sent email message information on the basis of a frequency of appearance of the keyword per message when the keywords per address are extracted, and the means for determining uses the weight information at the time of the comparison.

3. The communication terminal according to claim 1, wherein whether the destination address of the intended-to-be-sent email message is determined to be right or wrong by comparing the email-message history information of a target address which is the same as the destination address of the intended-to-be-sent email message with the intended-to-be-sent email message information.

4. The communication terminal according to claim 1, wherein whether the destination address of the intended-to-be-sent email message is determined to be right or wrong by comparing the email-message history information of a plurality of target addresses with the intended-to-be-sent email message information regardless of whether or not each of the target addresses is the same as the destination address of the intended-to-be-sent email message.

5. The communication terminal according to claim 1, wherein if a keyword implying a person's name is included in the first several lines of a message body of the intended-to-be-sent email message and if the keyword exists in the keywords corresponding to the target address, the degree of email-message correlation for the target address is increased by a predetermined amount or a predetermined ratio.

6. The communication terminal according to claim 1, further comprising means for providing, if another target address has a higher degree of email-message correlation than the target address which is the same as the destination address, the target address having the higher degree of email-message correlation as a destination candidate to a user.

7. A destination-address right/wrong determining method used in a communication terminal having an email message sending-and-receiving function, the method comprising the steps of:

storing email-message information of at least a sent email message as email-message history information;

storing email-message information of an intended-to-be-sent email message that is being prepared at said communication terminal, the intended-to-be-sent email message being an email message which has yet to be sent from the communication terminal, as intended-to-be-sent email message information;

determining with a processor at the communication terminal whether a destination address of the intended-to-be-sent email message is right or wrong by comparing the email-message history information with at least a message body of the intended-to-be-sent email message information; and displaying a notification of the wrong destination address to a user if the destination address is determined to be wrong and requesting the user to check the destination address prior to sending the email message from the communication terminal; and extracting keywords per target address from the email message history information and extracting keywords from the message body of the intended-to-be-sent email messages, wherein said determining determines whether the destination address of the intended-to-be-sent email message is right or wrong by comparing the keywords extracted from the intended-to-be-sent email message information with those extracted from the email message history information, and said determining obtains a degree of email-message correlation between the intended-to -be-sent email message and at least a sent email message sent to a target address by the comparison, and determines whether the destination address of the intended-to-be-sent email message is right or wrong on the basis of the degree of email-message correlation.

8. A communication terminal having an email message sending-and-receiving function, the communication terminal comprising:

an email-message history information storing unit configured to store email-message information of at least a sent email message as email-message history information;

an intended-to-be-sent email message storing unit configured to store email-message information of an intended-to-be-sent email message that is being prepared at the communication terminal, the intended-to-be-sent email message being an email message which has yet to be sent from the communication terminal, as intended-to-be-sent email message information;

a destination-address right/wrong determining unit having a processor programmed to determine whether a destination address of the intended-to-be-sent email message is right or wrong by comparing the email-message history information with the intended-to-be-sent email message information; and a display unit configured to display a notification of the wrong destination address to a user if the destination address is determined to be wrong and to request the user to check the destination address prior to sending the email message from the communication terminal wherein the processor is programmed to extract keywords per target address from the email message history information and extracts keywords from the message body of the intended-to-be-sent email message, wherein the destination-address right/wrong determining unit, determines whether the destination address of the intended-to-be-sent email message is right or wrong by comparing the keywords extracted from the intended-to-be-sent email message information with those extracted from the email-message history information, and obtains a degree of email-message correlation between the intended-to-be-sent email message and at least a sent email message sent to a target address by the comparison, and determines whether the destination address of the intended-to-be-sent email message is right or wrong on the basis of the degree of email-message correlation.

* * * * *